United States Patent
Hur et al.

(10) Patent No.: US 10,479,250 B2
(45) Date of Patent: Nov. 19, 2019

(54) STRUCTURE OF LEG-REST

(71) Applicant: DAE WON SAN UP CO., LTD, Ansan-si, Gyeonggi-do (KR)

(72) Inventors: Sun-Ho Hur, Seoul (KR); Young-Cheol Jang, Ansan-si (KR); Tae-Hyung Kim, Siheung-si (KR)

(73) Assignee: DAE WON SAN UP CO., LTD., Ansan-si, Gyeonggi-Do (KR)

( * ) Notice: Subject to any disclaimer, the term of this patent is extended or adjusted under 35 U.S.C. 154(b) by 0 days.

(21) Appl. No.: 15/957,137

(22) Filed: Apr. 19, 2018

(65) Prior Publication Data
US 2019/0322202 A1 Oct. 24, 2019

(51) Int. Cl.
*B60N 2/90* (2018.01)
*B60N 2/02* (2006.01)

(52) U.S. Cl.
CPC .......... *B60N 2/995* (2018.02); *B60N 2/0232* (2013.01); *B60N 2/929* (2018.02); *B60N 2/933* (2018.02); *B60N 2002/0236* (2013.01); *B60N 2002/924* (2018.02)

(58) Field of Classification Search
CPC ........ B60N 2/995; B60N 2/933; B60N 2/929; B60N 2/0232
USPC .................................................. 297/423.28
See application file for complete search history.

(56) References Cited

U.S. PATENT DOCUMENTS

| | | | | |
|---|---|---|---|---|
| 6,095,610 A | * | 8/2000 | Okajima ................ | B60N 2/995 297/423.28 |
| 8,444,226 B2 | * | 5/2013 | Driessen ................ | B60N 3/063 297/423.28 |
| 2018/0339632 A1 | * | 11/2018 | Akaike .................. | B60N 2/995 |

FOREIGN PATENT DOCUMENTS

| KR | 10-2014-0055057 A | 5/2014 |
|---|---|---|
| KR | 10-2016-0005274 A | 1/2016 |
| KR | 10-1687532 B1 | 12/2016 |
| KR | 10-16875321 B1 | 12/2016 |

* cited by examiner

*Primary Examiner* — Anthony D Barfield
(74) *Attorney, Agent, or Firm* — Novick, Kim & Lee, PLLC; Jae Youn Kim

(57) ABSTRACT

Provided is a structure of a leg-rest which is switchable at a front lower end of a seat between a receiving position where a support panel is folded on the seat and a deploying position where the support panel is drawn out to support the leg of a seated person. The structure of the leg-rest can include a fixing bracket which is fixed to the seat; a rotary arm of which one end is rotatably connected to the fixing bracket; a base slider which is slidably coupled to the rotary arm in a longitudinal direction; an extending slider which is slidably coupled to the base slider in a longitudinal direction and mounted with the support panel; and a rotary assist arm of which one end is separated from the rotary arm to be rotatably connected to the fixing bracket and the other end is rotatably connected to the base slider.

6 Claims, 9 Drawing Sheets

STRUCTURE OF LEG-REST

BACKGROUND

(a) Technical Field

The present invention relates to a structure of a leg-rest for a vehicle and more particularly, to a structure of a leg-rest capable of switching a support panel to a receiving position and an unfolding position using only one motor. The leg-rest of the present invention may be made lighter by reducing the number of components compared to the conventional structure and reduced in production cost.

(b) Background Art

As the marketability of vehicles increases, additional installation of various convenience devices is increasing, and generally, a leg-rest installed on the front end of a passenger seat is installed as one of the convenience devices of the seat. The leg-rest for the vehicle is generally installed below a rear seat of the vehicle and supports a calf portion of a seated person when placing to provide a comfort.

In the leg-rest for the vehicle, a manual type of switching the leg-rest from a receiving position (where the support panel supporting the calves is folded) to a deploying position (where the support panel is unfolded to support the calves) by a user's hand and an automatic type of switching the leg-rest to the deploying position when a switch is pressed using a power unit.

Manual and automatic leg-rests in the related art are commonly configured to be switched by a linking motion of a link device. The present applicant has also filed a leg-rest device for a vehicle with a more simplified structure (Korean Patent Application No. 10-2015-0171167, filed on Dec. 3, 2015).

The leg-rest in Korean Patent Application No. 10-2015-0171167 has a structure in which a leg frame rotates and rises at the same time according to a linking motion of a frame support, a connection support, and a slide support (as a trajectory difference caused by rotation of the connection support and the slide support and the rotation of the frame support occur at the same time) when the user moves the leg frame by a hand.

However, in such a conventional structure, in order to apply the automatic type (which is mounted with the motor to operate by a switch operation), at least two motors which generate a four-section linking motion among the leg frame, the frame support, the connection support, and the slide support have been required (that is, when one motor slides only one of link members, interference between the link members occurs and a normal operation cannot be secured).

However, in the case of using a plurality of motors, there is a problem in that the production cost is increased, additional cable arrangement and motor control are required, electric consumption further increases, and the weight is increased.

SUMMARY OF THE DISCLOSURE

Therefore, an object of the present invention is to provide a structure of a leg-rest which operates using only one motor. In the present invention, the motor is configured so that relative motion among link members occurs simultaneously at two places (that is, relative motion between a base slider and an extending slider and relative motion between the base slider and a rotary arm) to secure a normal operation without interference between the link members.

In order to achieve the object described above, an exemplary embodiment of the present invention provides a structure of a leg-rest which is switchable at a front lower end of a seat between a receiving position where a support panel is folded on the seat and a deploying position where the support panel is drawn out to support the leg of a seated person, comprising: a fixing bracket which is fixed to the seat; a rotary arm of which one end is rotatably connected to the fixing bracket; a base slider which is slidably coupled to the rotary arm in a longitudinal direction; an extending slider which is slidably coupled to the base slider in a longitudinal direction and mounted with the support panel; a rotary assist arm of which one end is separated from the rotary arm to be rotatably connected to the fixing bracket and the other end is rotatably connected to the base slider; and a sliding device which slides the rotary arm and the extending slider in opposite directions to each other from the base slider, in which when the sliding device slides the rotary arm and the extending slider from the base slider in opposite directions to each other, the movement of the extending slider is performed so that the support panel is switched between the receiving position and the deploying position due to a difference in trajectory between the rotary arm and the rotary assist arm.

In the present invention, the sliding device may include a motor which is mounted on the base slider; a screw which is fixed to the extending slider and connected to the motor to be slidable; and a pinion gear which is rotatably mounted on the base slider, in which first gear holes engaging with the pinion gear are formed in the extending slider in a longitudinal direction, second gear hole engaging with the pinion gear are formed in the rotary arm in a longitudinal direction, and when the extending slider slides by the sliding of the screw, the rotary arm slides in an opposite direction to the extending slider together with the rotation of the pinion gear.

In one embodiment of the present invention, a rotation shaft of the motor may be connected with a worm wheel and the screw may have threads formed on the outer circumferential surface to receive the rotational force from the worm wheel to slide according to the rotation of the motor.

In addition, each of the extending slider and the base slider may have a rectangular panel shape and two rotary arms may be coupled to one side and the other side of the base slider, respectively. Furthermore, a wing portion having a first sliding groove which is inserted with both sides of the extending slider and a second sliding groove into which the rotary arm is introduced may be formed at each of both sides of the base slider.

Since the present invention having the above configuration can operate using only one motor, it is possible to reduce the production cost and the weight, reduce the number of cables connected with the motor, and simplify the control of the motor as compared with a conventional structure in which two or more motors are mounted.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
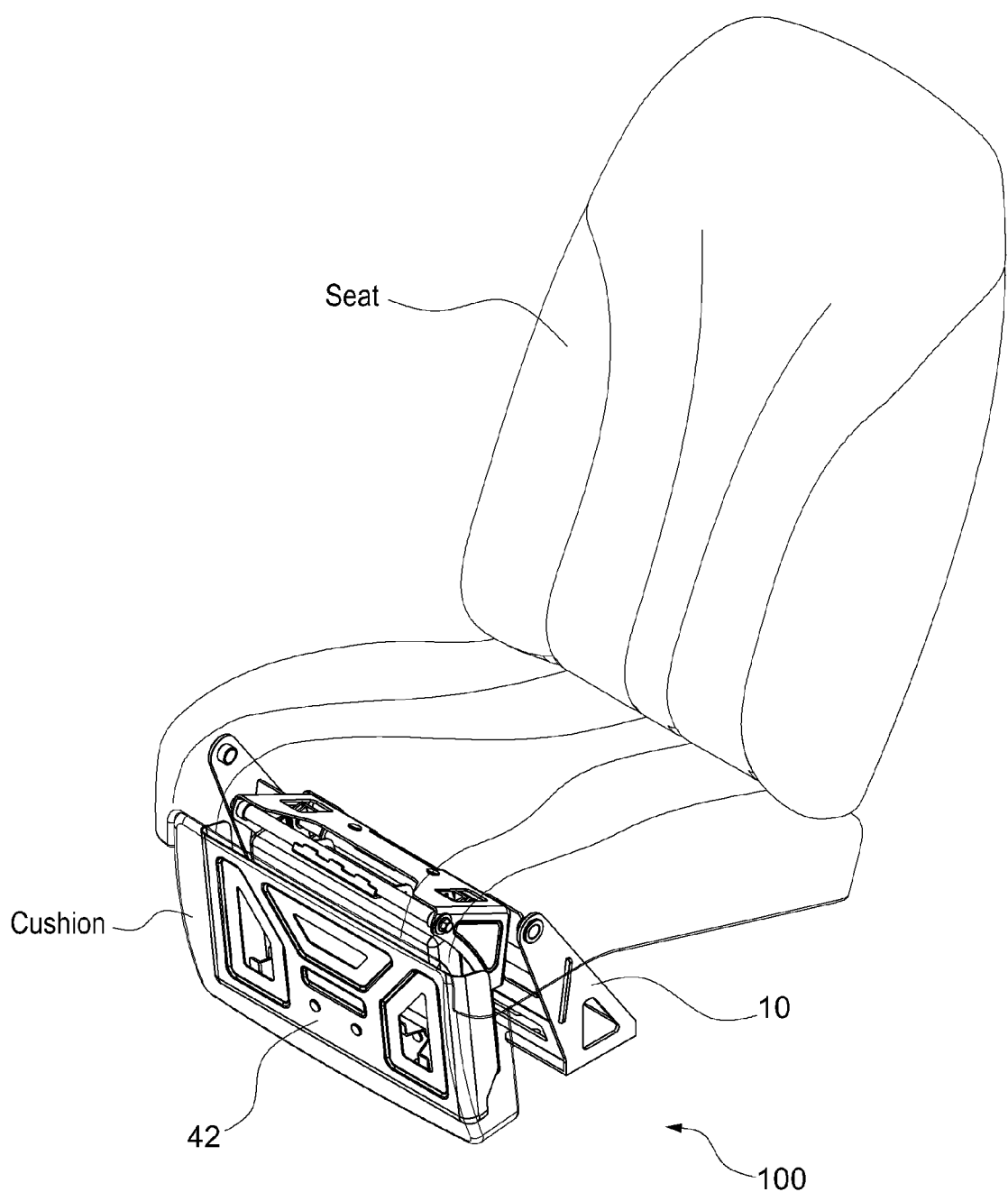
FIG. 1 is a diagram illustrating a state in which a leg-rest according to a preferred embodiment of the present invention is mounted on a seat.

The present invention will be described more fully hereinafter with reference to the accompanying drawings, in which exemplary embodiments of the invention are shown. However, the present invention can be realized in various different forms, and is not limited to the exemplary embodiments described herein.

In order to clearly describe the present invention, portions which are not related to the description will be omitted. Like reference numerals designate like or similar components throughout the specification.

Terms or words used in this specification and claims should not be interpreted as being limited to typical or dictionary meanings, but should be interpreted as having meanings and concepts which comply with the technical spirit of the present disclosure, based on the principle that an inventor can appropriately define the concept of the term to describe his/her own invention in the best manner.

Hereinafter, preferred exemplary embodiments of the present invention will be described in detail with reference to the accompanying drawings.

Figure 2:
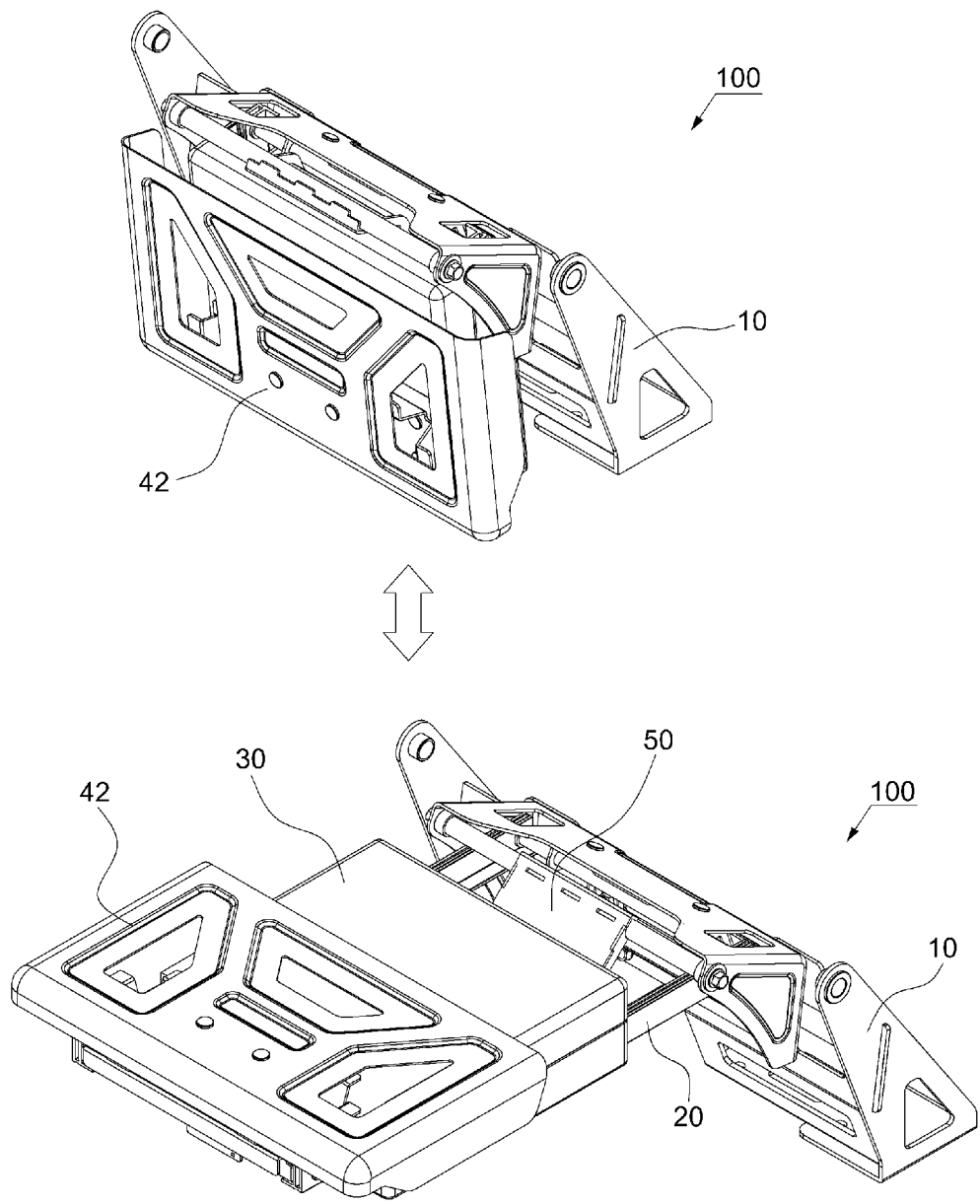
FIG. 2 is a diagram illustrating a state (the upper diagram) when the leg-rest according to the preferred embodiment of the present invention is at the receiving position and a state (the lower diagram) when the leg-rest is at the deploying position.

As illustrated in FIG. 1, the present invention relates to a leg-rest 100 installed on the front lower end of a seat, and as illustrated in FIG. 2, the leg-rest 100 according to the present invention can be switched from a receiving position (a state illustrated at the upper side) where a support panel 42 is folded to the seat and a deploying position (a state illustrated at the lower side) where the support panel 42 is drawn out to support the leg of a seated person.

Referring to FIG. 1, the leg-rest 100 of the present invention is configured to include a fixing bracket 10, a rotary arm 20, a base slider 30, an extending slider 40, a rotary assist arm 50, and a sliding device.

The fixing bracket 10 is made of a metallic material to be fixed to the seat through bolting, welding, or the like and one end of the rotary arm 20 is rotatably connected to the fixing bracket 10.

In addition, the other end of the rotary arm 20 is coupled to the base slider 30 and the base slider 30 is slidably coupled in a longitudinal direction. The extending slider 40 is slidably coupled to the base slider 30 in a longitudinal direction and the support panel 42 (see FIGS. 1 and 2) is installed on the upper surface of the extending slider 40 to support the calves of a passenger. On the upper surface of the support panel 42, a soft cushion made of leather or artificial leather, synthetic leather, and the like which is the same as or similar to the seat is mounted (see FIG. 1).

Figure 3:
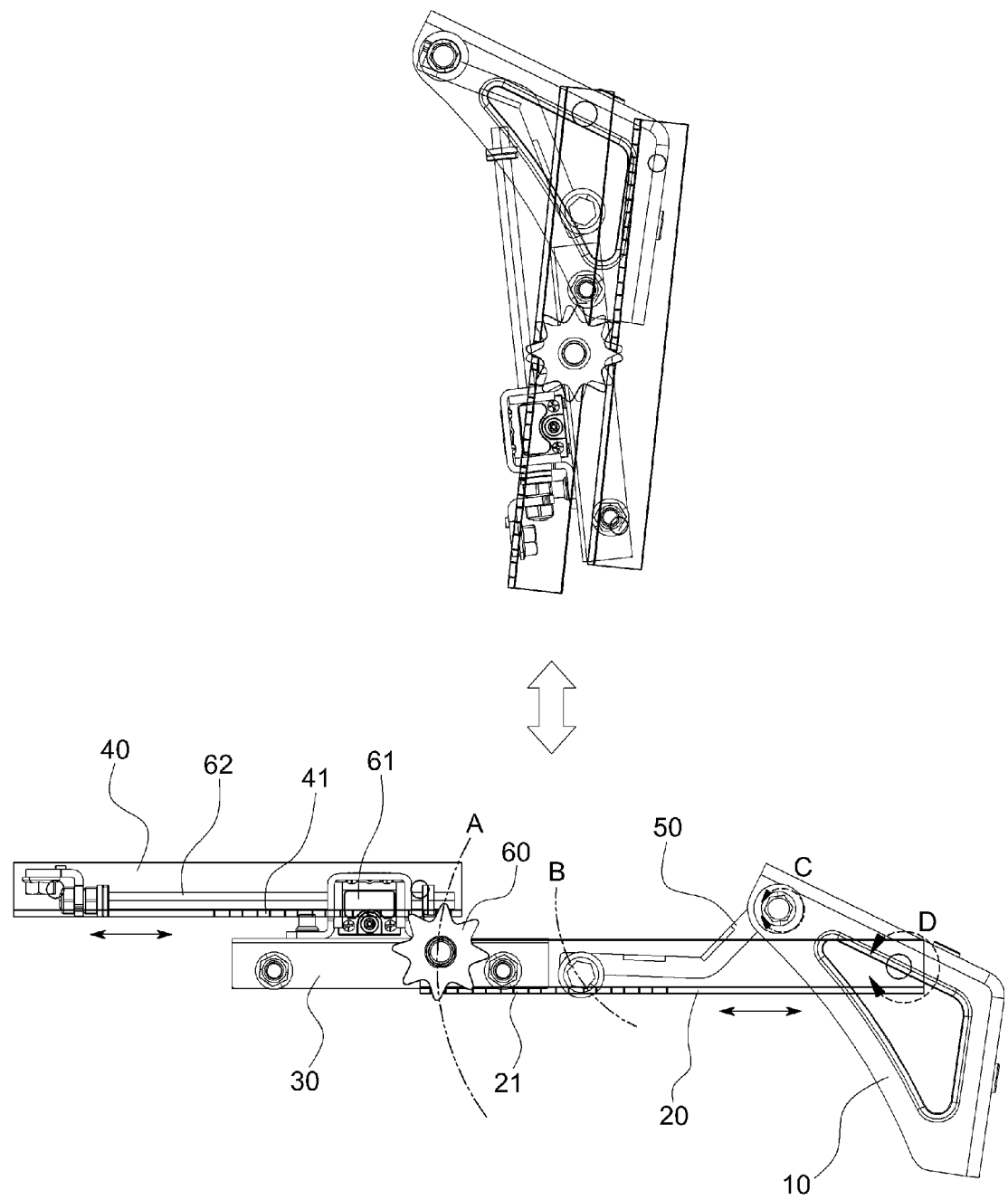
FIG. 3 is a diagram illustrating projected side states when the leg-rest of FIG. 2 is at the receiving position (the upper diagram) and is at the deploying position (the lower diagram)

The rotary assist arm 50 is separated from the rotary arm 20 to be rotatably connected to the fixing bracket 10 and the other end thereof is rotatably connected to the base slider 30. That is, the rotary assist arm 50 connects the fixing bracket 10 and the base slider 30 separately from the rotary arm 20. As illustrated in FIG. 3 in more detail, a rotation shaft C of the rotary assist arm 50 is spaced apart from a rotation shaft D of the rotary arm 20, and lengths of the rotary arm 20 and the rotary assist arm 50 are different from each other, and thus, a trajectory B of the end of the rotary assist arm 50 is also different from a trajectory A of the end of the rotary arm.

Furthermore, in the present invention, the base slider 30 further includes a sliding device for sliding the rotary arm 20 and the extending slider 40 in directions opposite to each other.

Figure 4:
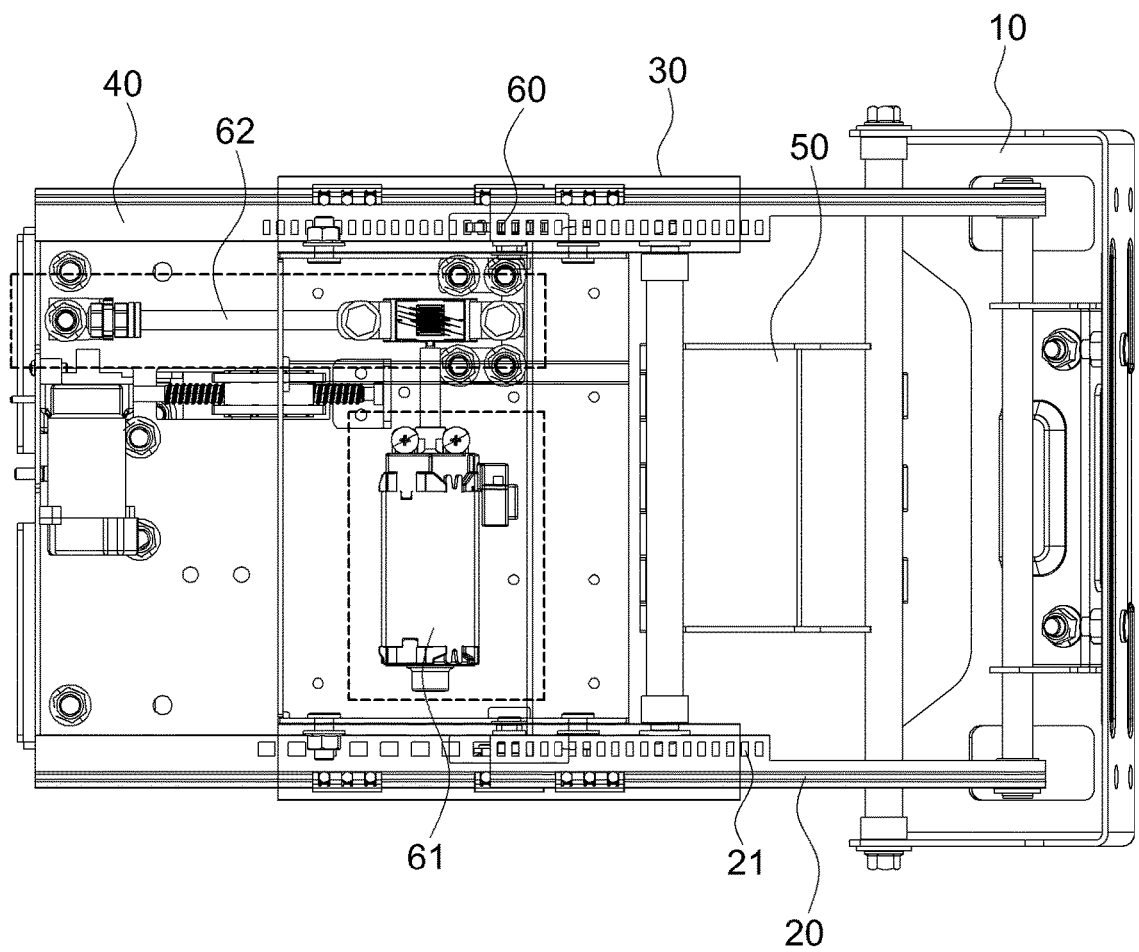
FIG. 4 is a diagram illustrating a projected state shown when the leg-rest is viewed toward the top from the bottom at the deploying position.
Figure 5A:
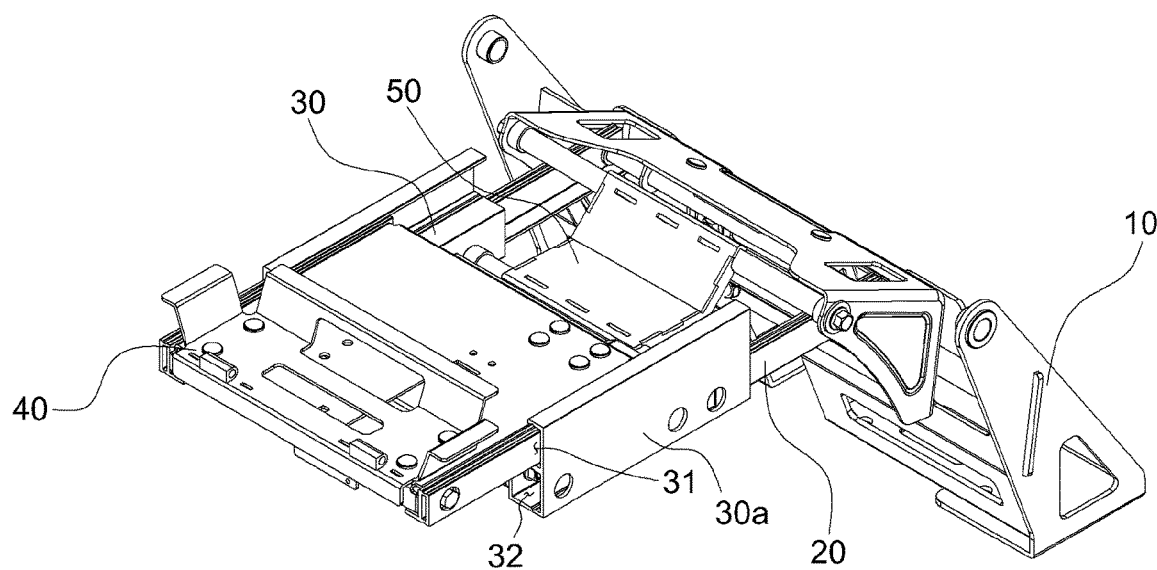
FIG. 5A is a perspective view illustrating a state when the leg-rest is at the deploying position while a support panel is separated from an extending slider.
Figure 5B:
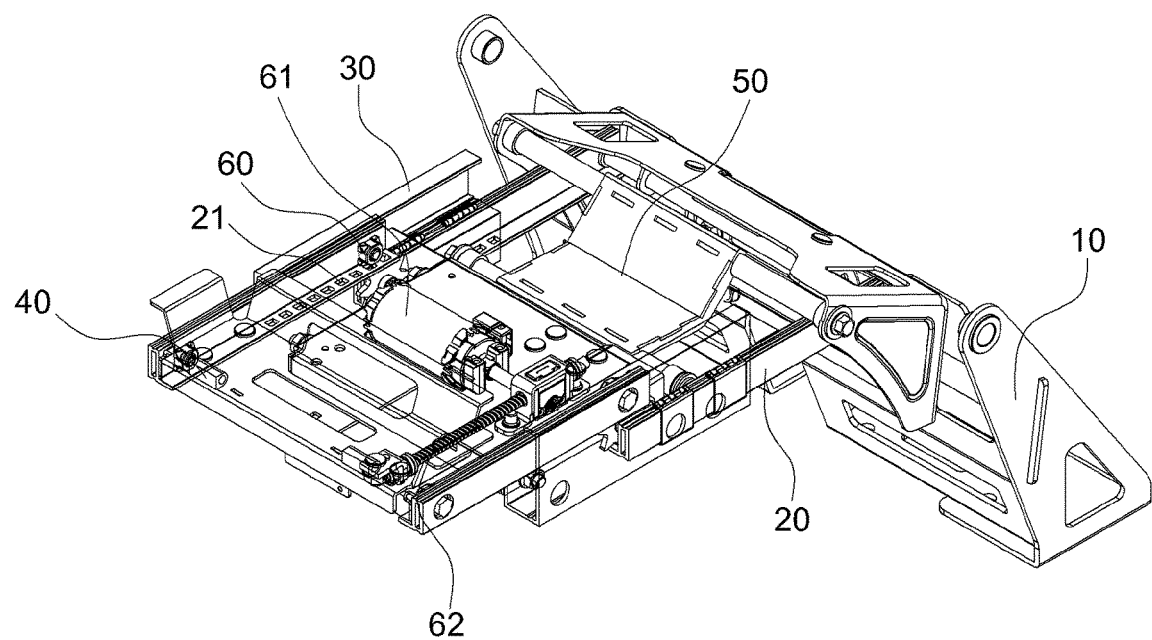
FIG. 5B is a diagram illustrating a state which is partially projected so that the interior is shown in FIG. 5A.

The sliding device includes a motor 61, a screw 62, and a pinion gear 60. The motor 61 is fixed to the base slider 30 as illustrated in FIGS. 5A and 5B, and the screw 62 is fixed to the extending slider 40 and connected to the motor 61 (see FIG. 4) to be slidable in a longitudinal direction (in a sliding direction of the extending slider) according to the rotation of the motor 61.

Figure 6A:
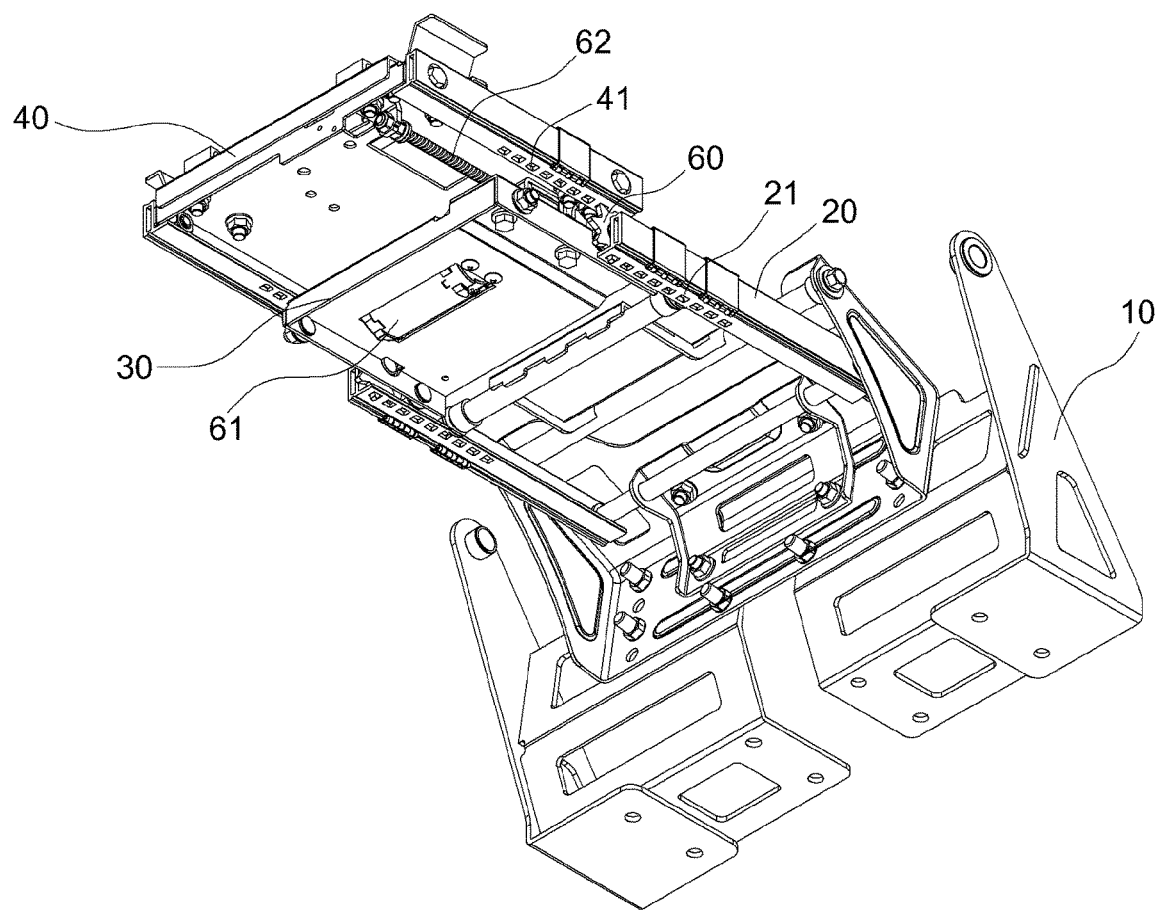
FIG. 6A is a perspective view illustrating a state shown when the leg-rest is viewed toward the top from the bottom at the deploying position.

In addition, the pinion gear 60 of which the rotation shaft is fixed to the base slider 30 is rotatable at the base slider 30. The pinion gear 60 is rotatable and reversible, and the upper end of the pinion gear 60 engages with first gear holes 41 (see FIG. 6A) perforated in the extending slider 40 and the lower end of the pinion gear 60 engages with second gear holes 21 (see FIGS. 4 and 6A) perforated in the rotary arm 20. A plurality of first gear holes 41 and second gear holes 21 are formed at predetermined intervals in the longitudinal direction in the extending slider 40 and the rotary arm 20, respectively, to engage with gear teeth of the pinion gear 60.

Figure 6B:
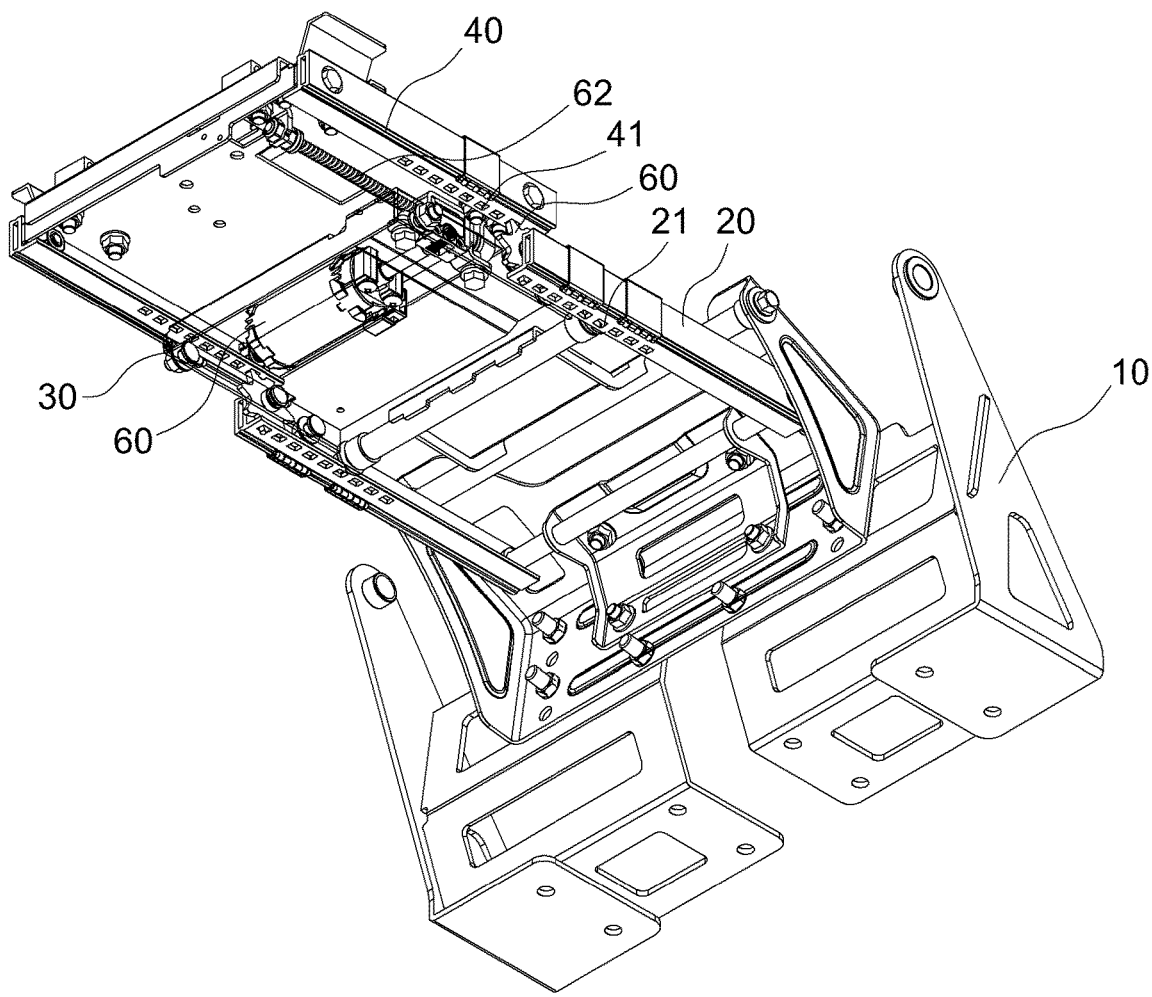
FIG. 6B is a diagram illustrating a state which is partially projected so that the interior is shown in FIG. 6A.

Further, in the exemplary embodiment of the present invention, the rotation shaft of the motor 61 is connected to a worm wheel (not shown) so as to slide the screw 62 while reducing the rotational force of the motor 61, and the screw 62 has a structure (see FIGS. 6A and 6B) having threads formed on the outer circumferential surface to receive the rotational force from the worm wheel. The configurations for decelerating the motor through the worm gear and sliding the screw are well known and will not be described in more detail herein.

Accordingly, when the motor 61 operates to slide the screw 62, the extending slider 40 slides together from the base slider 30 by sliding the screw 62 and the pinion gear 60 also rotates at the same time, and the rotary arm 10 also slides in an opposite direction to the extending slider 40 from the base slider 30. That is, for example, in the lower side of FIG. 3, when the motor 61 operates to slide the extending slider 40 to the left side based on the base slider 30 in FIG. 3, the pinion gear 60 rotates counterclockwise and the rotary arm 20 slides to the right side. In addition, when the extending slider 40 slides to the right side based on the base slider 30, the pinion gear 60 rotates clockwise and the rotary arm 20 slides to the left side.

Figure 7:
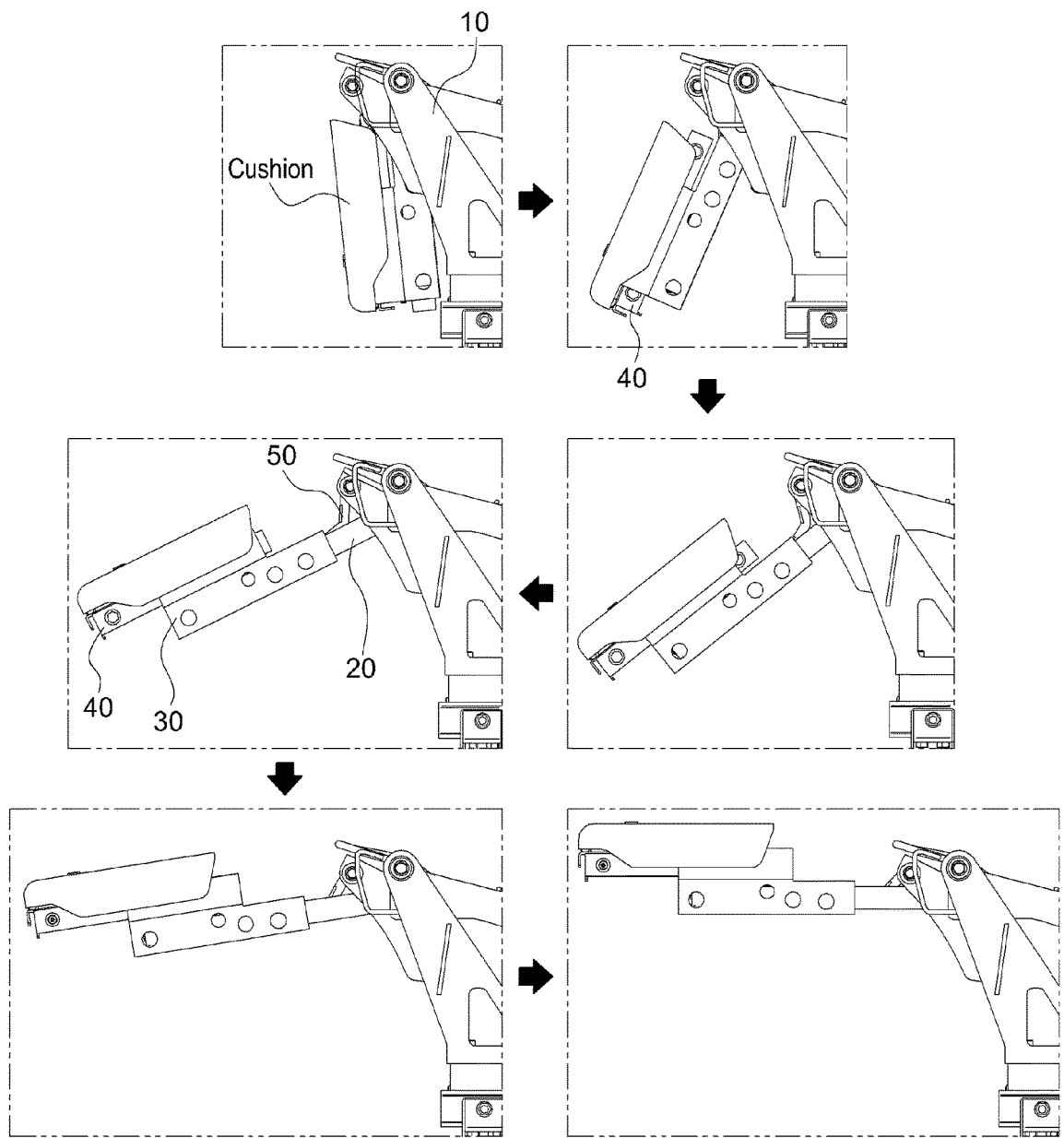
FIG. 7 is a diagram illustrating a process of switching the leg-rest from a receiving position to a deploying position in sequence.

Therefore, when the motor 61 extends the base slider 30 and the extending slider 40 from the rotary arm 20 (the base slider slides the rotary arm and the extending slider in opposite directions to each other) while the rotary arm 20 is fixed to the fixing bracket 10, the rotary arm 20, the base slider 30, and the extending slider 40 are rotated to be lifted simultaneously with the sliding due to a difference in trajectory between the rotary arm 20 and the rotary assist arm 50, and the support panel 42 mounted on the extending slider 40 moves to the deploying position. That is, as illustrated in FIG. 4, when the force is applied to the rotary arm 20 in a direction far away from the base slider 30 while the rotation shaft C of the rotary assist arm 50 and the rotation shaft D of the rotary arm 20 are spaced apart from each other, a part of the force is switched into the force for rotating the end of the rotary assist arm 50 at the base slider 30. As a result, the rotary assist arm 50 and the rotary arm 20 are rotated in a lifting direction and simultaneously, the extending slider 40 slides from the base slider 30 to move to the deploying position. Such an operation state is illustrated in FIG. 7 in sequence.

Accordingly, the leg-rest 100 of the present invention may be automatically switched between the deploying position and the receiving position when the seated person presses a switch that rotates and/or reverses the motor 61.

Meanwhile, in the exemplary embodiment of the present invention, the sliding device is formed such that each of the extending slider 40 and the base slider 30 has a rectangular panel shape as shown in the drawings, and two rotary arms 20 are configured to be coupled to one side and the other side of the base slider 30, respectively (see FIGS. 5A to 6B).

Furthermore, in order to induce stable sliding of the rotary arm 20 and the extending slider 40 at the base slider 30, a wing portion 30a may be selectively mounted on each of both sides of the base slider 30 (see FIG. 5a). The wing portion 30a has a structure having a first sliding groove 31 which is inserted with the side of the extending slider 40 and a second sliding groove 32 into which the rotary arm 20 is introduced. The wing portion 30a is manufactured to be integrated with the base slider 30 or separated from the base slider 30, and then may be coupled with the base slider 30 through bolting or the like.

Since the leg-rest 100 of the present invention described above can operate using only one motor, it is possible to reduce the production cost and the weight, reduce the number of cables connected with the motor, and simplify the control of the motor, as compared with a conventional structure in which two or more motors are mounted.

The aforementioned present invention is not limited to the aforementioned exemplary embodiments and the accompanying drawings, and it will be obvious to those skilled in the technical field to which the present invention pertains that various substitutions, modifications, and changes may be made within the scope without departing from the technical spirit of the present invention.

What is claimed is:

1. A structure of a leg-rest which is switchable at a front lower end of a seat between a receiving position where a support panel is folded on the seat and a deploying position where the support panel is drawn out to support a leg of a seated person, the structure comprising:
    a fixing bracket which is fixed to the seat;
    a rotary arm of which one end is rotatably connected to the fixing bracket;
    a base slider which is slidably coupled to the rotary arm in a longitudinal direction;
    an extending slider which is slidably coupled to the base slider in the longitudinal direction and mounted with the support panel;
    a rotary assist arm of which one end is separated from the rotary arm to be rotatably connected to the fixing bracket and the other end is rotatably connected to the base slider; and
    a sliding device which slides the rotary arm and the extending slider in opposite directions to each other from the base slider,
    wherein when the sliding device slides the rotary arm and the extending slider from the base slider in the opposite directions to each other, a movement of the extending slider is performed so that the support panel is switched between the receiving position and the deploying position due to a difference in trajectory between the rotary arm and the rotary assist arm.

2. The structure of the leg-rest of claim 1, wherein the sliding device includes
    a motor which is mounted on the base slider;
    a screw which is fixed to the extending slider and connected to the motor to be slidable; and
    a pinion gear which is rotatably mounted on the base slider,
    wherein first gear holes engaging with the pinion gear are formed in the extending slider in the longitudinal direction, second gear hole engaging with the pinion gear are formed in the rotary arm in the longitudinal direction, and when the extending slider slides by sliding of the screw, the rotary arm slides in an opposite direction to the extending slider together with rotation of the pinion gear.

3. The structure of the leg-rest of claim 2, wherein a rotation shaft of the motor is connected with a worm wheel and the screw has threads formed on an outer circumferential surface thereof to receive rotational force from the worm wheel to slide according to rotation of the motor.

4. The structure of the leg-rest of claim 3, wherein each of the extending slider and the base slider has a rectangular panel shape and wherein the rotary arm comprises a first rotary arm and a second rotary arm which are coupled to one side and another side of the base slider, respectively.

5. The structure of the leg-rest of claim 2, wherein each of the extending slider and the base slider has a rectangular panel shape and wherein the rotary arm comprises a first rotary arm and a second rotary arm which are coupled to one side and another side of the base slider, respectively.

6. The structure of the leg-rest of claim 5, wherein a wing portion having a first sliding groove which is inserted with both sides of the extending slider and a second sliding groove into which the rotary arm is introduced is formed at each of both sides of the base slider.

* * * * *